United States Patent
Chen et al.

(10) Patent No.: US 7,551,985 B1
(45) Date of Patent: Jun. 23, 2009

(54) METHOD AND APPARATUS FOR POWER CONSUMPTION OPTIMIZATION FOR INTEGRATED CIRCUITS

(75) Inventors: Pinhong Chen, Saratoga, CA (US); Wilsin Gosti, Fremont, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 11/590,068

(22) Filed: Oct. 30, 2006

(51) Int. Cl.
G06F 19/00 (2006.01)

(52) U.S. Cl. ............... 700/297; 700/286

(58) Field of Classification Search ............ 716/4, 716/2, 18, 14–16, 6–10; 326/83, 41; 702/60, 702/57, 97; 700/286
See application file for complete search history.

(56) References Cited

U.S. PATENT DOCUMENTS

| | | | | |
|---|---|---|---|---|
| 5,473,545 | A * | 12/1995 | Schausten | 700/215 |
| 5,754,435 | A * | 5/1998 | Sato | 702/60 |
| 5,764,532 | A * | 6/1998 | Patel | 716/9 |
| 6,779,163 | B2 | 8/2004 | Bednar et al. | |
| 6,820,240 | B2 | 11/2004 | Bednar et al. | |
| 6,883,152 | B2 | 4/2005 | Bednar et al. | |
| 7,000,214 | B2 * | 2/2006 | Iadanza et al. | 716/18 |
| 7,111,266 | B2 * | 9/2006 | Correale et al. | 716/10 |
| 7,243,312 | B1 * | 7/2007 | Lysaght et al. | 716/2 |
| 2002/0059553 | A1 * | 5/2002 | Eng | 716/4 |
| 2005/0108667 | A1 | 5/2005 | Iadanza et al. | |
| 2005/0192787 | A1 * | 9/2005 | Kuwahara et al. | 703/18 |
| 2006/0125470 | A1 | 6/2006 | Chen et al. | |
| 2006/0190755 | A1 | 8/2006 | Kim | |
| 2008/0176525 | A1 * | 7/2008 | Agazzi et al. | 455/128 |

FOREIGN PATENT DOCUMENTS

WO   WO-2005/125012 A1   12/2005

OTHER PUBLICATIONS

Girard et al., Technique for Reducing Power Consumption, Mar. 13, 1997, Electronic Letter p. 485-486.*
Alcantara et al., Methodology For Dynamic Power Consumption Estimation using VHDL description, 2002, IEEE, no page numbers.*
Bhunia, S. et al. (Mar. 2005). "Low-Power Scan Design Using First-Level Supply Gating," *IEEE Transactions on Very Large Scale Integration (VLSI) Systems* 13(3):384-395.

(Continued)

*Primary Examiner*—Kidest Bahta
(74) *Attorney, Agent, or Firm*—Duane Morris LLP; Stephen C. Durant

(57) ABSTRACT

Method and apparatus for finding an assignment of voltages to all power domains of an integrated circuit such that the power consumption of an integrated circuit design is minimized and timing requirements (signal propagation delay or slack) are met. This is done by modeling both internal and external signal paths in an integrated circuit which has a number of power domains. The relationship between slack and voltage for the external and internal signal propagation paths is modeled, typically as a linear approximation. The integrated circuit design is then abstracted to a simplified form in terms of power domain relations and a model is created and solved iteratively using, e.g., linear programming, of different voltage levels for each power domain and including the slack values and their relationship between the changes in voltage and slack, for both the internal and external paths.

21 Claims, 13 Drawing Sheets

OTHER PUBLICATIONS

Bonhomme, Y. et al. (Jul. 9-11, 2001). "A Gated Clock Scheme for Low Power Scan-Based BIST," *IEEE Proceedings Seventh International On-Line Testing Workshop*: Giardini Naxos, Taormina, Italy, pp. 87-89.

Hatami, S. et al. (May 23-26, 2005). "A Low-Power Scan-Path Architecture," *IEEE Conference Proceedings International Symposium on Circuits and Systems (ISCAS)*, at International Conference Center: Kobe, Japan, pp. 5278-5281.

Wu, Huaizhi et al. (Nov. 6-10, 2006). "Post-Placement Voltage Island Generation Under Performance Requirement," *ICCAS-2005*, at *International Conference on Computer Aided Design*: DoubleTree Hotel, San Jose, CA, pp. 309-316.

Wu, Huaizhi et al. (Jul. 24-28, 2006). "Timing-Constrained and Voltage-Island-Aware Voltage Assignment," *Proceedings 2006, Design Automation Conference*, at The Moscone Center: San Francisco, CA, pp. 429-432.

Yoshida, T. et al. (Nov. 18-20, 2002). "MD-SCAN Method for Low Power Scan Testing," *Proceedings of the 11$^{th}$ Asian Test Symposium*: Guam, USA, 6 pages.

\* cited by examiner

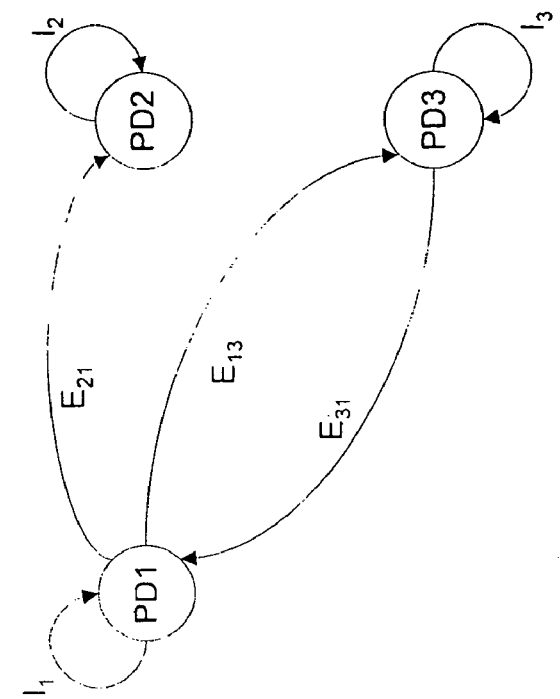
Fig. 7
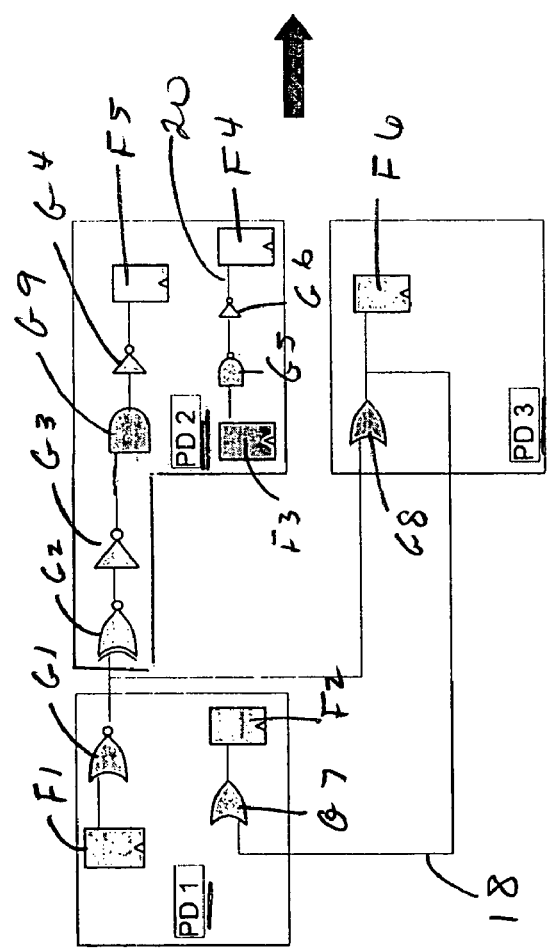

METHOD AND APPARATUS FOR POWER CONSUMPTION OPTIMIZATION FOR INTEGRATED CIRCUITS

FIELD OF THE INVENTION

This disclosure relates to the field of electronic design automation (EDA) tools and to integrated circuit design and simulation.

BACKGROUND OF THE INVENTION

With the rapid growth of wireless and portable consumer electronic devices, there have been increasing demands for new technological advancements with more and more functionalities being put into battery-operated electronic devices. This has resulted in increasing design and verification challenges for such low-power devices. There is also the corresponding problem in non-battery operated devices of excess heat production given the relatively large amounts of electric power typically used by current integrated circuits. Hence the need to reduce power is present not only in battery-operated devices but also in devices provided with mains electric current, due to the heat problem.

The pertinent challenges included minimizing leakage power dissipation, designing efficient packaging and cooling systems for high-power integrated circuit, and verifying functionalities of low-power or no power situations early in the design. Such power management issues become more critical in view of the continuous shrinking of integrated circuit (chip) device dimensions, that is the size of transistors, with each subsequent generation of transistors becoming smaller. Hence more and more power is being consumed in smaller and smaller devices resulting in significant heat issues. Addressing such power management issues has been identified by the industry as being critical in the integrated circuit design, especially for portable consumer electronic devices but not so limited.

Power consumption as well known has two components, dynamic and static power. Static power consumption is due to leakage current which is inherent in transistor devices. Dynamic power is a result of the switching activities of each transistor. Dynamic power consumption dominates total power consumption in integrated circuits (ICs). There are two types of multi-supply voltage known in the field. In the row-based type there are interleaved high and low supply voltage standard cell placement rows. In the region-based type, circuits are partitioned into voltage islands where each voltage island occupies a contiguous physical space and operates at a particular supply voltage and meets a particular performance requirement. This disclosure applies to both types, and other types, as long as there is a logical description of which cells or portions of an integrated circuit are contained in which power domains.

A power domain as described here has no physical restrictions in terms of the actual integrated circuit layout. More specifically, the dynamic electric power consumption P of an integrated circuit is measured by the equation $P = k \cdot f \cdot C \cdot V^2$, where k is the transistor switching speed, f is the IC clock frequency, C is the load capacitance, and V is the applied power (supply) voltage. Integrated circuit designs are typically partitioned into power domains. Each power domain has its own supply voltage level assigned so that all devices (transistors) in the domain are subject to the same input voltage. Various domains may have the same power levels, of course. Typical integrated circuits have two to ten or twenty domains, but this is not limiting. Each power domain may include one or more hierarchical modules, each of which includes several integrated circuit elements such as flip-flops (memory elements) and/or logic gates. Each flip-flop and logic gate typically includes one or more transistors (devices). Typically each individual power domain is assigned a voltage, from a fixed minimum to a fixed maximum. However the voltage of an IC can often be adjusted once it is placed on a circuit board.

Another relevant feature is delay or slack or signal propagation delay which is well known as a non-linear function of the input slew, the output capacitance (or impedance), and the supply voltage. Each flip-flop or logic gate in the design has its own slack value. Typically the slack value for any element of the design is the slack value of the longest path, which is the slowest signal path, through that element. The longest path going through the element is not necessarily the critical path. (We typically use the term critical path to define the slowest path of the entire design.) The slack values of all elements of a critical path are identical. This value is defined to be the slack of the critical path. It can be appreciated that each element has many signal paths, but as part of the IC design process, the longest path (slowest path) is routinely identified.

Therefore, there is a well known technical problem that high power consumption not only leads to shortened battery life for portable devices, not only computer devices but also cell phones, etc., and also causes on-chip thermal and reliability problems in general. Since as explained above power consumption is proportional to the square of the supply electrical voltage, reducing supply voltage significantly reduces power consumption. The above described power domain or multi-supply voltage (MSV) approach produces finer-grain power and performance tradeoffs. In this case performance refers to the slack or signal propagation delay. It is well known that there is the technical problem of tradeoffs between optimal power versus particular performance requirements, and/or optimal performance requirements versus particular power requirements. We are dealing with the tradeoff between power consumption and design performance. A user can ask what is the fastest design implementation under a power requirement or what is the lowest possible design implementation under a performance requirement. See for instance "Post-Placement Voltage Island Generation Under Performance Requirement", Huaizhi WU et al., published by the IEEE, publication number 0-7803-9354-X/05, incorporated herein by reference in its entirety. See also "Timing-Constraint and Voltage-Island-Aware Voltage Assignment", Huaizhi WU et al., published by the ACM, 2006, publication 1-59593-381-6/06/00007, also incorporated also herein by reference in its entirety.

SUMMARY

This disclosure relates to a method and apparatus or system for finding an assignment of voltages to all power domains of an integrated circuit design such that the power consumption of the integrated circuit design is minimized and the timing requirements are met. The method is directed to the tradeoff between power consumption and design performance. A user can ask what is the fastest design implementation under a power requirement or what is the lowest possible power consumption design implementation under a performance requirement. A user of the method may require that some power domains have fixed voltages.

In accordance with the invention, a computer implemented method is provided to make and/or simulate a design of an integrated circuit which has a plurality of power domains. Each power domain contains one or more hierarchical blocks. A power domain can contain multiple hierarchical blocks.

This is an input to the method. The method itself does not partition a power domain into hierarchical blocks. A longest signal path is found for each block or other portion in each power domain, and for each power domain. (Critical signal paths are only defined for the entire design. They can however go through power domains.) One then assigns a minimum or maximum power voltage level for each domain as a starting point and optimizes the power consumption for the entire design (or for part of it, at least) given a particular performance (timing) target. This optimizing is typically carried out using a set of equations involving linear programming for each power domain considering both the internal path(s) of each power domain and the external path(s) of power domain to power domain.

Hence the goal in one embodiment is to find an assignment of voltages to each power domain in the IC design such that the power consumption of the entire design is minimized and the timing (slack) requirements are met.

BRIEF DESCRIPTION OF THE DRAWINGS

FIG. 7 shows detail of FIG. 2, showing the relationship between the FIG. 2 circuit and an abstraction of the circuit to power domain relations in the right-hand portion of FIG. 7.

DETAILED DESCRIPTION

Figure 1:
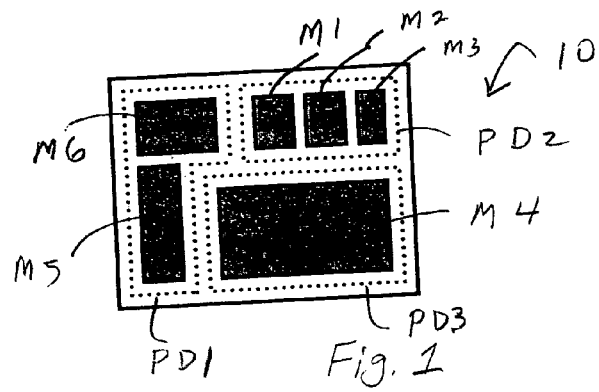
FIG. 1 shows an integrated circuit with several power domains, some of which have more than one hierarchical module or block.

In one embodiment, this disclosure is directed to a method for simulating and/or designing an integrated circuit having a plurality of power domains, where each power domain has a set of power characteristics (electric power supply characteristics), and is capable of being powered up/powered down independent of other power domains of the circuit and of having a different level of voltage supplied to it compared to other power domains. The present method includes receiving a netlist description of the integrated circuit design in a gate-level representation or equivalent, receiving power information specifications of the circuit design, associating the plurality of power domains in the power information specifications in the netlist description, determining internal and external critical signal paths the circuit design, and assigning a minimum voltage level for each power domain and optimizing (minimizing) the power consumption of the entire circuit design.

In another embodiment, a computer program product for simulating a circuit is provided. The computer program product includes computer code for carrying out the above method. The computer program product is typically stored on a computer readable medium as a computer program for execution by one or more computer systems having at least a processing unit, user interface and a memory as is conventional. Further, in accordance with the invention there is provided a programmed computer which carries out this method and also an apparatus in the form of computer software which carries out this method.

Various methods and systems are provided here for simulating an integrated circuit and designing same. The following description is presented to enable anyone of ordinary skill in the art to make and use the invention. Description of specific embodiments and applications are provided only as examples. Various modifications and combinations of the examples described herein will be readily apparent to those skilled in the art, and a general principles defined herein may be applied to other examples and applications without departing from the spirit and scope of the invention. Thus, the process invention is not intended to be limited to the examples disclosed, but is to be accorded the widest scope consistent with the principles and features disclosed herein.

Some portions of the detailed description here are presented in terms of flow charts, logic blocks and other symbolic representations of operations on information that can be performed on a computer system. A procedure, computer-executed step, logic block, process, etc. is here conceived to be a sequence with one or more steps or instructions leading to a desired result. The steps are those utilizing physical manipulations of physical quantities. These quantities can take the form of electrical, magnetic or radio signals capable of being stored, transferred, combined, compared and otherwise manipulated on a computer system. These signals may be referred to herein as bits, values, elements, symbols, characters, terms, numbers or the like. Each step may be formed by computer hardware, software, firmware or combinations thereof.

In one embodiment, a system for simulating or designing an integrated circuit is implemented using a conventional computer system which includes one or more central processing units, a user interface, a memory device, a system bus, and one or more bus interfaces for connecting the CPU, user interface, memory device and system bus together. The computer system may also include at least one network interface for communicating with other devices on a computer network. In alternative embodiments, much of the functionality of the circuit simulator/designer may be implemented in one or more application-specific integrated circuits or field-programmable gate arrays which are types of integrated circuits, thereby either eliminating the need for a CPU or reducing the role of the CPU and simulating the integrated circuit. The memory device may include a high-speed random access memory or may also include a non-volatile memory such as one or more magnetic disk storage devices. The memory device may also include mass storage remotely located from the central processing unit. The memory device would typically store an operating system and application software.

Figure 2:
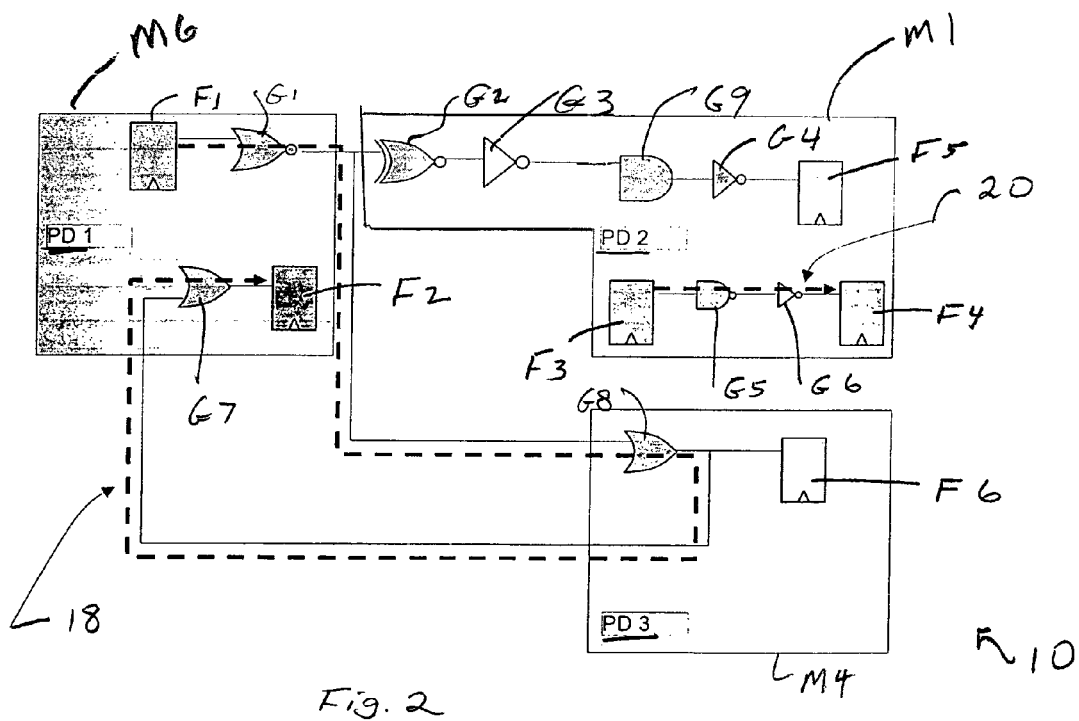
FIG. 2 shows additional detail of FIG. 1, including an internal path and an external path for signal propagation.

FIG. 1 here shows a graphical representation of an integrated circuit 10, in plan view. Integrated circuit 10 includes, as described above, power domains PD1-PD3. Each power domain conventionally includes at least one hierarchical module or block. For instance, power domain PD3 includes hierarchical module M4. Power domain PD2 includes three hierarchical modules M1, M2 and M3. Similarly, power domain PD1 includes two hierarchical modules M5 and M6. In accordance with this disclosure, in one embodiment one attempts to assign supply voltages to all power domains such that the power consumption of the entire integrated circuit 10 is minimized and the timing requirements (slack requirements) are met. One models signal propagation delay linearly with respect to voltage change. It has been determined that scaling voltage on internal paths of particular power domains does not affect the delay in other power domains. At any point along a signal path, there is a particular delay from the start of the path to point, which is called the arrival time. The upper bound of the delay of the path is the timing requirement of the path. This translates to the required time of the point, which is simply the latest arrival time allowed before it violates the timing requirement of the path. The slack at the point is defined as the difference between the required time and the arrival time. If the slack is positive, it means the timing requirement is met at that point. If the slack is negative, the timing requirement is not met at that point. In FIG. 2, showing more detail of the FIG. 1 integrated circuit 10, power domain PD1 includes a module M6 including flip-flops F1 and F2 and logic gates G1 and G7. There is an external signal path 18 which includes power domain PD1 and power domain PD3 which as shown includes logic gate G8 and flip-flop F6. The other power domain here PD2 includes in module M1 flip-flops F3, F4 and F5 and gates G9, G4, G5 and G6 and also gates G2, G3. All gates are assigned to a power domain, which may be a DEFAULT power domain, conventionally. The internal signal path 20 in power domain PD2 is shown with a broken line.

Figure 3:
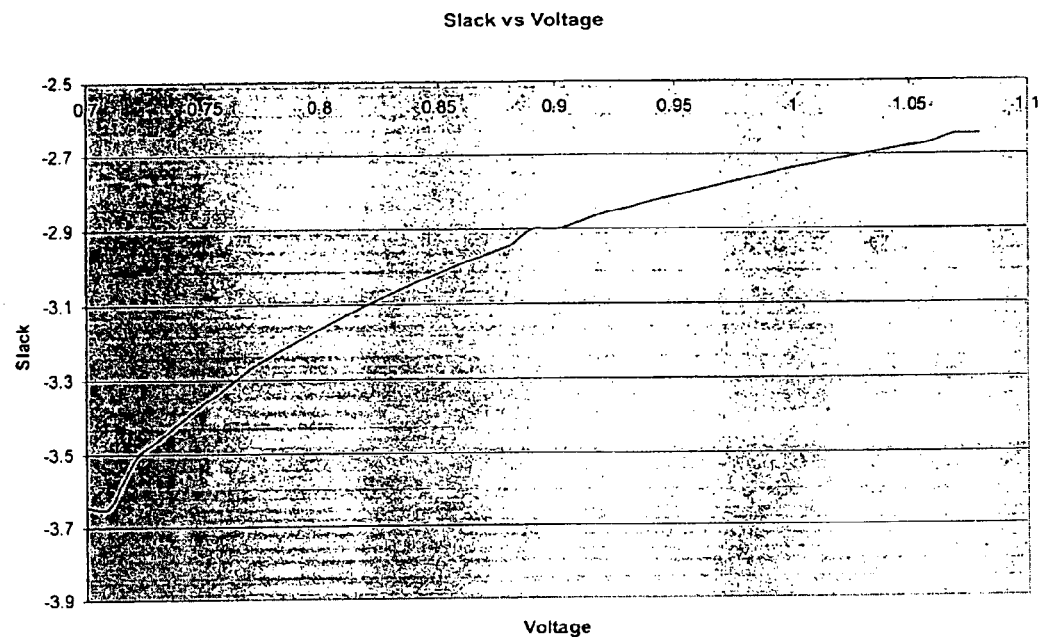
FIG. 3 is a plot of slack (propagation delay) versus voltage for internal circuit paths as shown in FIG. 2.

As is clear in this case, scaling (changing) voltage on external signal paths such as path 18 does change the delay (slack) of other power domains. This is explained further hereinafter. FIG. 3 is a plot of slack (vertical axis) versus supply voltage (horizontal axis) for internal paths such as path 20 in FIG. 2. As seen by the plot, for a small change of voltage the slack change is close to linear, although the entire curve is not linear. Hence as an approximation internal slack $I_i = \alpha_i \cdot \Delta V_i$ where the subscript $_i$ refers to a particular power domain. Here $\alpha_i$ is the constant which relates slack to voltage change. (In all cases here, "voltage" refers to the power supply voltage to a particular power domain and/or integrated circuit.)

Figure 4:
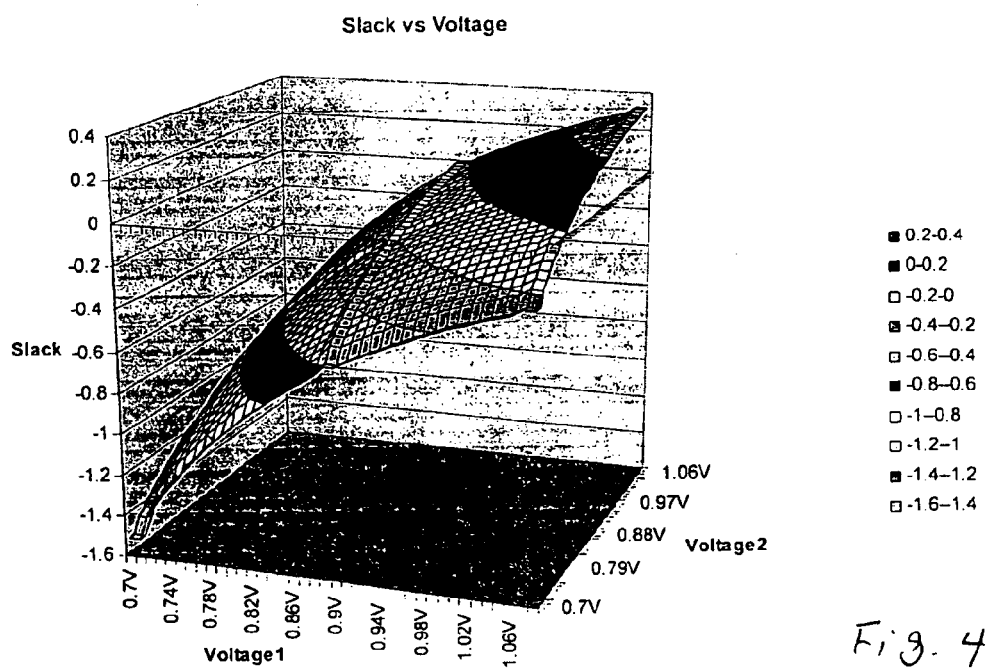
FIG. 4 is a plot of slack versus voltage for external circuit paths as shown in FIG. 2, showing slack as a function of two variables, which are voltages voltage 1 and voltage 2 in respectively two power domains.
Figure 5:
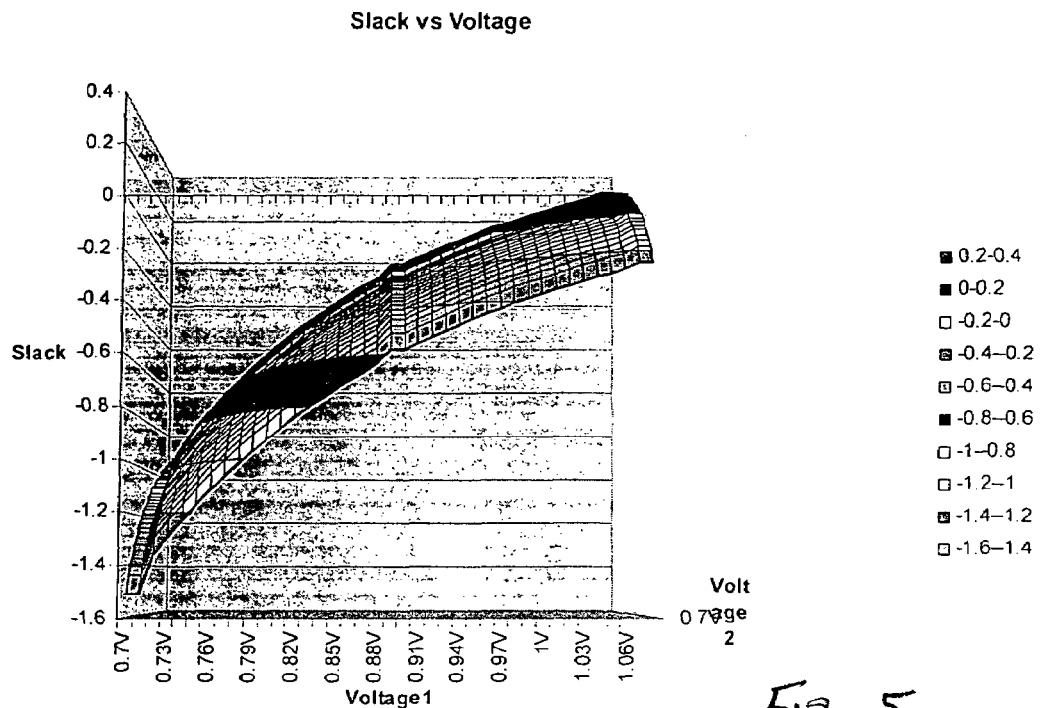
FIG. 5 shows slack versus voltage, also for external paths, of slack versus voltage 1 for each value of voltage 2.

For external paths the situation is more complex, as understood from FIG. 2. For external paths, for a small change of voltage the slack change is also close to linear. However now it is a function of two variables, which are the voltages voltage 1, voltage 2 in respectively each of the two related power domains which the external path passes through. This is shown in FIG. 4 where the first horizontal axis is voltage 1 for power domain 1, the second horizontal axis is voltage 2 for power domain 2, and the vertical axis is slack. This instead of a line gives a curved surface, which over any short distance is relatively planar. The various values for the plots are shown in the key in FIG. 4. (The key in the right-hand portion of FIG. 5 shows ranges of slack value to aid in reading the plot.) Further as shown in FIG. 5, the shape (slope) of the plot of slack versus voltage 1 is almost identical for each value of voltage 2, see the key in the right-hand portion of FIG. 5.

Figure 6:
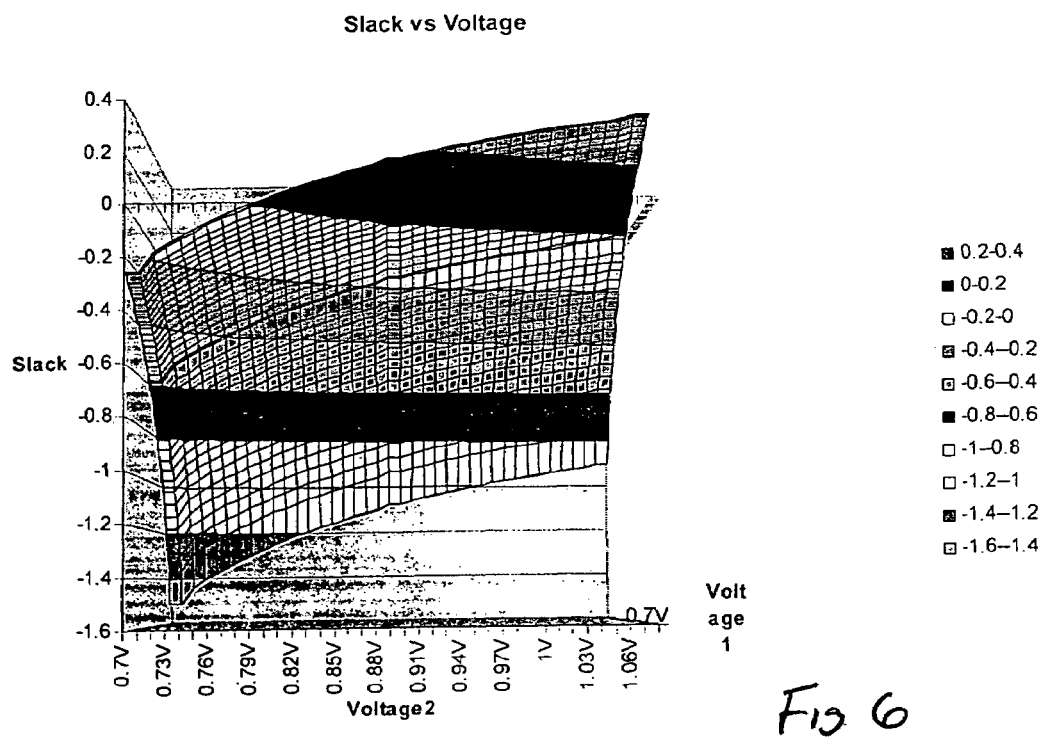
FIG. 6 also shows slack versus voltage for external paths, showing the slope of slack versus voltage 2 is almost identical for each value of voltage 1.

Further, for external paths as shown in FIG. 6, the shape (slope) of slack versus voltage 2 is almost identical for each value of voltage 1, which is the supply voltage for power domain 1. Again the key is shown in the right-hand portion of FIG. 6. One can then approximate the effect of simultaneously changing both voltage 1 and voltage 2 as the equation $E_{ij} + E_{ji} = \beta_{ij} \cdot \Delta V_i + \beta_{ji} \cdot \Delta V_j$ where E refers to external slack and the subscript $_{ij}$ refers to the path going from power domain i to power domain j, whereas the subscript $_{ji}$ refers to the slack in the path from power domain j to power domain i. Similarly, the β values are constants relative to the path from power domain i to power domain j, etc.

Therefore it is possible to mode these relationships. One does this to abstract a particular integrated circuit design into power domain to power domain relations. As stated above, the variable $I_i$ refers to the slack change of internal paths of power domain i to a voltage change in the supply voltage supplied to power domain i. The value $E_{ij}$ refers to the slack change on paths from power domain i to power domain j due to a voltage change in power domain i. The left-hand portion of FIG. 7 replicates FIG. 2 and this relatively complex circuit can be abstracted to the simplified version in the right-hand part of FIG. 7, ignoring the logic gates and flip-flops and merely substituting the variables I and E referring to slack. This model is useful for computing slack with respect to voltage change in power domains.

This relationship for power P, as shown in the right-hand portion of FIG. 7, can be generally modeled algebraically by the following optimization approach. Since we are minimizing the power consumption, k the switching speed is a constant and can be ignored:

$$\min P = \sum_i f_i \cdot C_i \cdot (V_i + \Delta V_i)^2$$

$$s_i + \alpha_i \cdot \Delta V_i \geq 0$$

$$s_{ij} + \beta_{ij} \cdot \Delta V_i + \beta_{ji} \cdot \Delta V_j \geq 0$$

where $\Delta V_i$: change of voltage in power domain i;

$s_i$: slack for internal paths in power domain i;

$s_{ij}$: slack for external paths from power domain i to power domain i;

$\alpha_i$: delay slope on internal paths with respect to voltage change; and $\beta_{ij}$: delay slope on external paths from power domain i to j with respect to voltage change.

One simplifies this as:

$$\min \sum_i f_i \cdot C_i \cdot (V_i + \Delta V_i)^2 \approx \min \sum f_i \cdot C_i \cdot \Delta V_i$$

This can be solved as a linear programming problem:

$$\min P = \sum_i f_i \cdot C_i \cdot \Delta V_i$$

$$s_i \alpha_i \cdot \Delta V_i \geq 0$$

$$s_{ij} + \beta_{ij} \cdot \Delta V_i + \beta_{ji} \cdot \Delta V_j \geq 0$$

Since the linear assumption of the model is only valid for a small change of voltage for each power domain (as illustrated by the above graphs where in fact the curves and surfaces are not actually straight lines or planes), one must restrict the voltage change as follows:

$$-V_{i,max} \leq \Delta V_i \leq V_{i,max}$$

Using this restriction one can then solve the above linear programming problem iteratively using conventional computer programs which are well known for linear programming. (Linear programming is a well-known mathematical technique for solving complex problems with many variables where sometimes an exact answer is not possible but can be approximated.) One can do this by adjusting the value $V_{i,max}$ for each iteration to determine the optimum voltage. Further detail of this is illustrated hereinafter.

Figure 8:
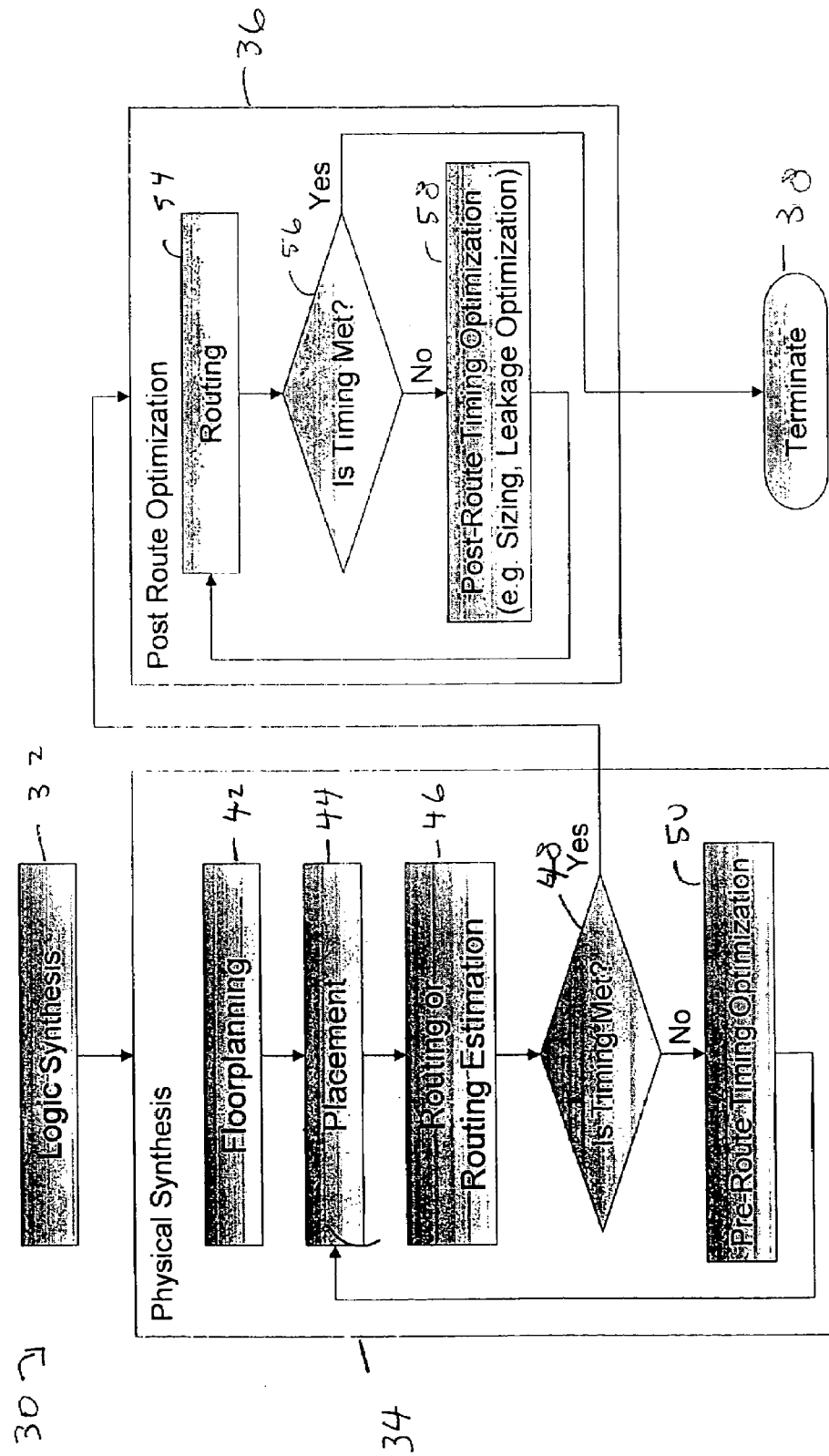
FIG. 8 is an IC design flowchart in accordance with the present disclosure.

FIG. 8 shows logic flow for, for instance, a computer program for carrying out embodiments of the present invention including the above process. While the actual computer code is not shown herein, since this is essentially a linear programming problem in the context of circuit synthesis both of which are generally well known, actual writing the computer code would be routine in light of this disclosure and the following detailed flow charts. A typical computer language suitable here is C++ and the logic flow of FIG. 8 typically would be implemented to operate with an EDA tool such as SOC Encounter, commercially available from Cadence Systems.

FIG. 8 thus shows a process 30 in accordance with the present disclosure as carried out typically by computer programs, most portions of which are conventional. In FIG. 8 the first step is logic synthesis 32 which is conventional in the field of integrated circuit design and/or simulation, and precedes the processes in accordance with this disclosure. After logic synthesis 32 the next main step is the physical synthesis 34 which includes the routine steps of floor planning 42 the integrated circuit, placement 44 of the various circuit modules as described above, then routing or routing estimation 46 for interconnection of the modules. At this point it is determined at 48 if the timing (slack) requirement is met. If so, one then goes to the next step which is post-route optimization 36. If not, one performs pre-route timing optimization 50.

The post-route optimization 36 includes first the routing step 54 following by determining again if the timing requirement is met at 56. If yes, one terminates at 38. If no, one performs post-route timing optimization 58 which includes steps such as sizing of the transistor devices, or leakage current optimization. (These sub-steps are well known in the field.)

Figure 9:
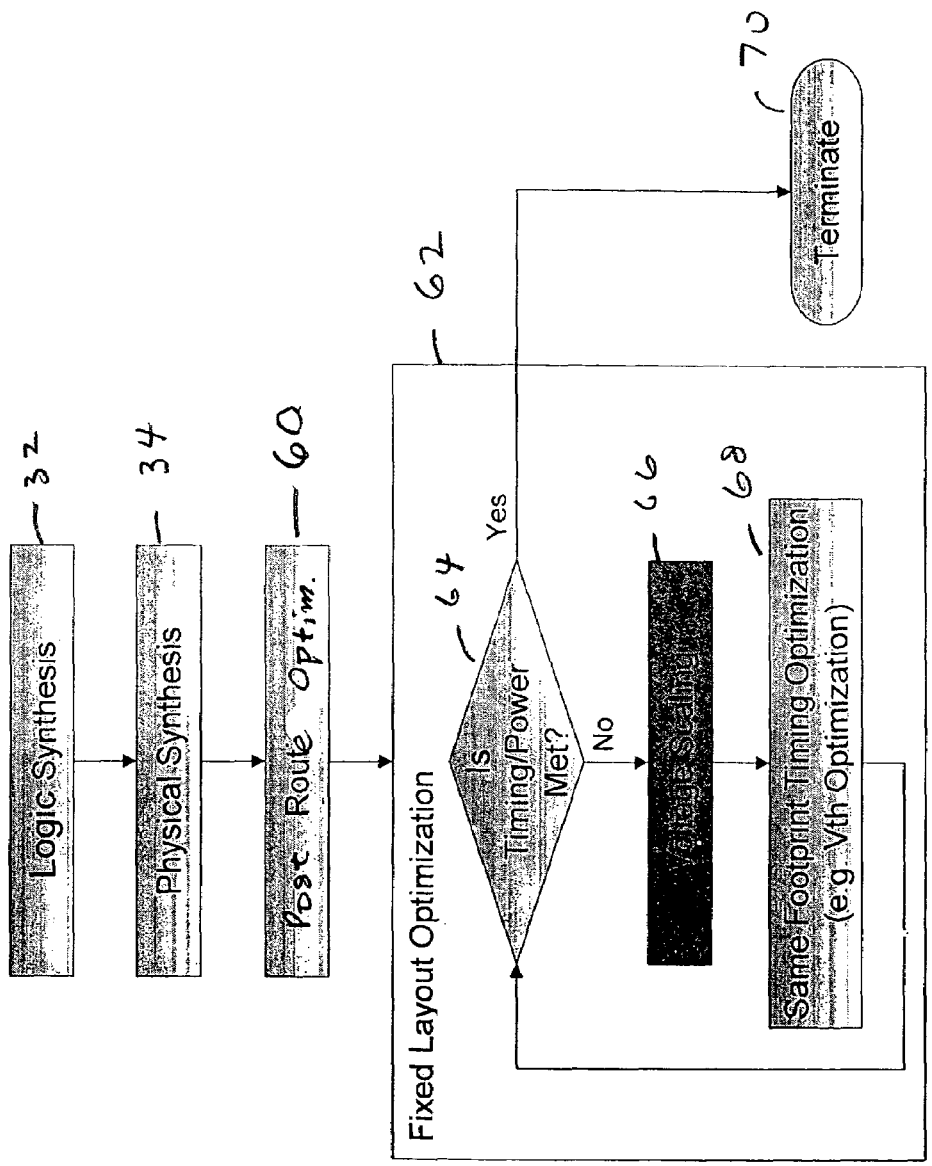
FIG. 9 shows in a flowchart the post-routing voltage scaling relating to FIG. 8.

FIG. 9 illustrates a first post-route voltage scaling process flow beginning with the steps described above of logic synthesis 32 and physical synthesis 34 followed by the post route optimization 60 (same as Step 36 in FIG. 8). Optimization 60 is followed by the fixed layout optimization 62, the first sub-step of which involves determining if the timing/power requirement is met at 64. If yes, one terminates at 70; if not, one proceeds to voltage scaling 66, that is adjusting the voltage for each power domain. This is followed then by using a timing optimization 68, i.e. for each voltage V. Two circuit cells of the same footprint have identical dimensions and pin locations. In this fixed-layout optimization step, a cell replacing another cell of the same footprint does not require re-placement and re-routing of the circuit.

Figure 10:
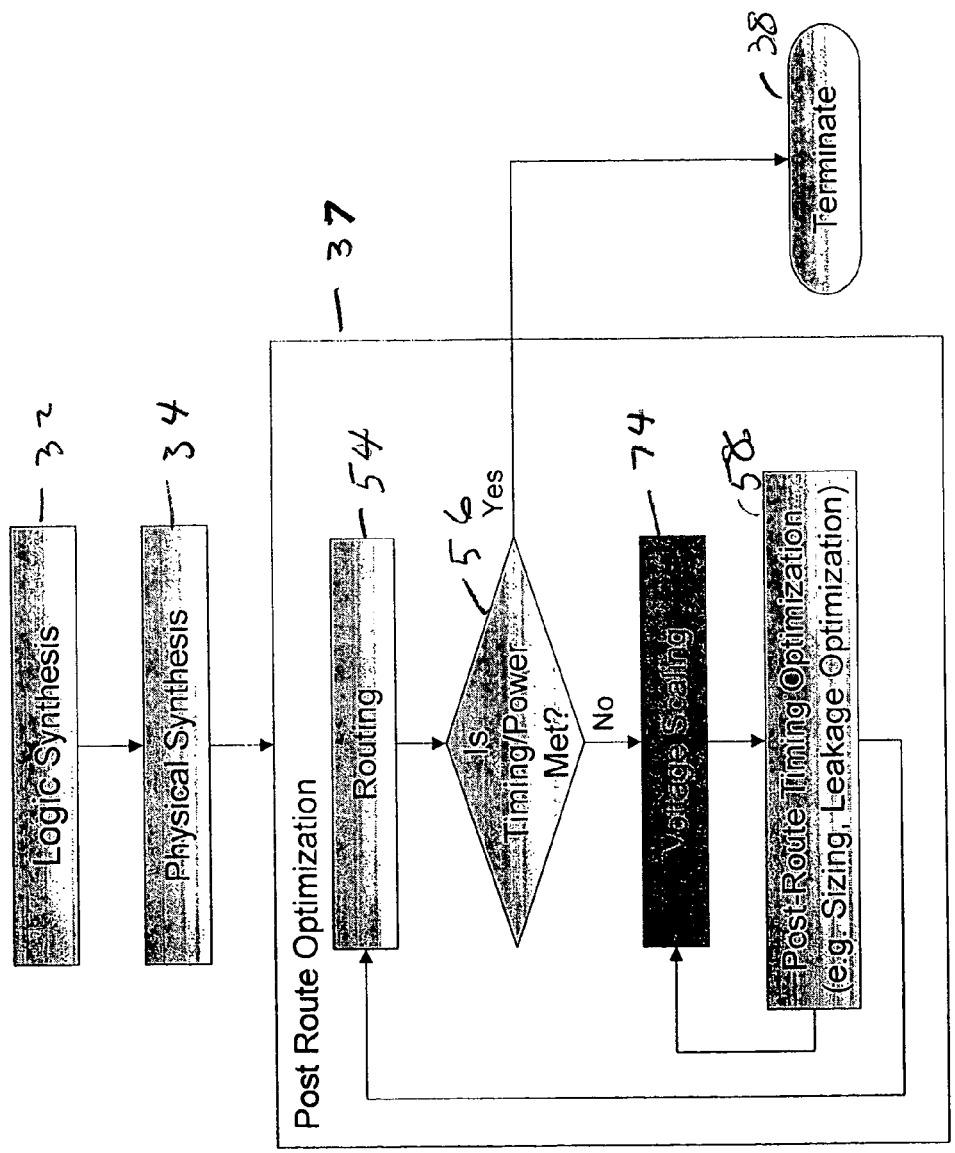
FIG. 10 shows in a flowchart the post-routing voltage scaling for the post-route optimization.

FIG. 10 shows a second logic flow for post-route voltage scaling (an alternate to FIG. 9) which begins as in FIG. 9 with phases 32 and 34 and then proceeds to a somewhat different post-route optimization 37 (differing from that shown in FIG. 8). FIG. 10 includes the routing 54 followed by the timing/power determination 56 which if yes indicates a termination at 38. If no, one then proceeds to the voltage scaling step 74 followed by the post-route timing optimization 58, involving again as in FIG. 8 device sizing and/or leakage current optimization.

Figure 11:
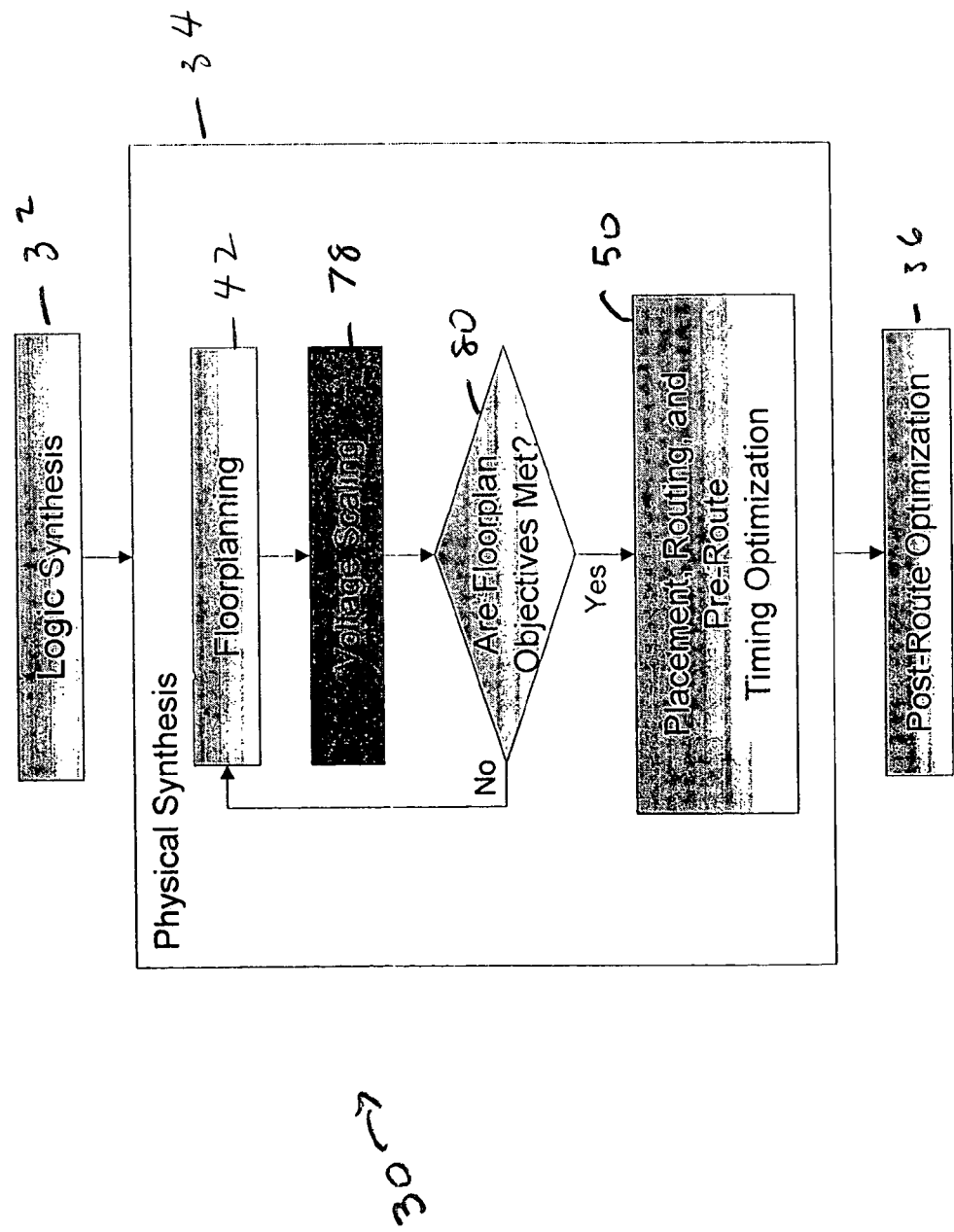
FIG. 11 shows in a flowchart voltage scaling for pre-placement.

FIG. 11 shows the pre-placement voltage scaling flow (taking place prior to placement phase 44 in FIG. 8) beginning as in FIG. 8 with the logic synthesis 32 and proceeding to the physical synthesis 34, which in this case includes first the (routine) floor planning 42 followed by the voltage scaling 78. At this point it is determined if the floor plan objectives have been met at 80, which is a routine step. (Floor plan relates to circuit layout and area.) If not, one returns to the floor planning 42. If yes, one proceeds to the placement routing and pre-route timing optimization 50 and then to the above-described post-route optimization 36.

Figure 12:
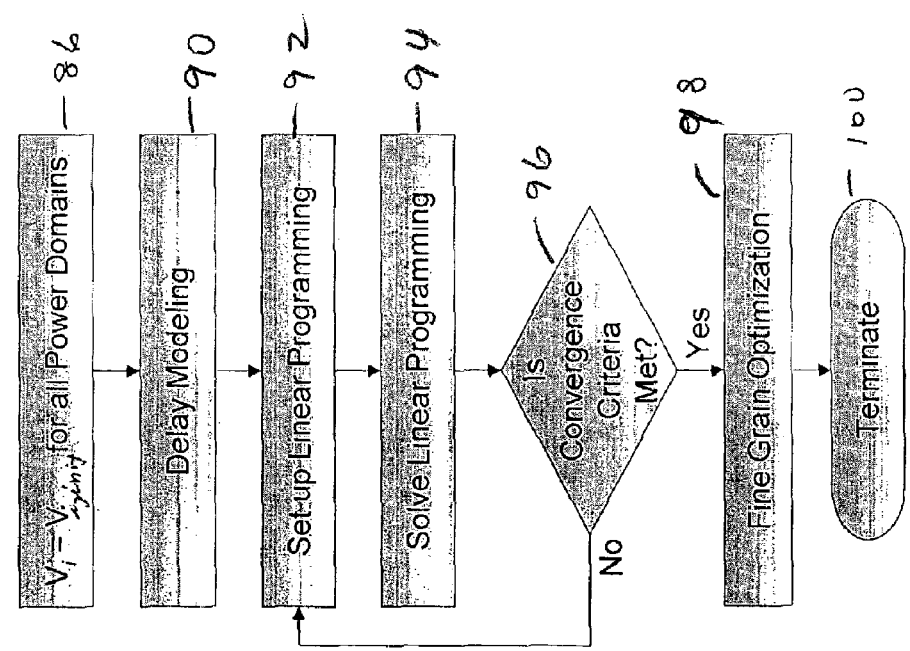
FIG. 12 shows in a flowchart a linear programming solution process in accordance with the present disclosure.

In FIG. 12, a process for the above-described linear programming solution to the above-described scaling 66, 74 (which is one way to carry out the presently disclosed method) is shown in a separate flow chart and which follows the above-described equations formulation of this process. This process 84 begins with setting the voltage $V_i$ equal to the initial value $V_{i,init}$ for all power domains in the design at 86 where Vmax is some arbitrarily chosen supply voltage. One then performs delay modeling 90. Next, one sets up the linear programming equations 92 followed by solving the linear programming problem 94. (Further detail is given below.) At this point one determines if the convergence criteria have been met at 96. If yes, then one performs the fine-grain optimization 98 and then terminates at 100. If the convergence criteria are not met at 98 one proceeds to re-solve the linear programming problem at 92. The objective is to find voltage change $\Delta V$ for each power domain as described in the equation formulation above.

Figure 13:
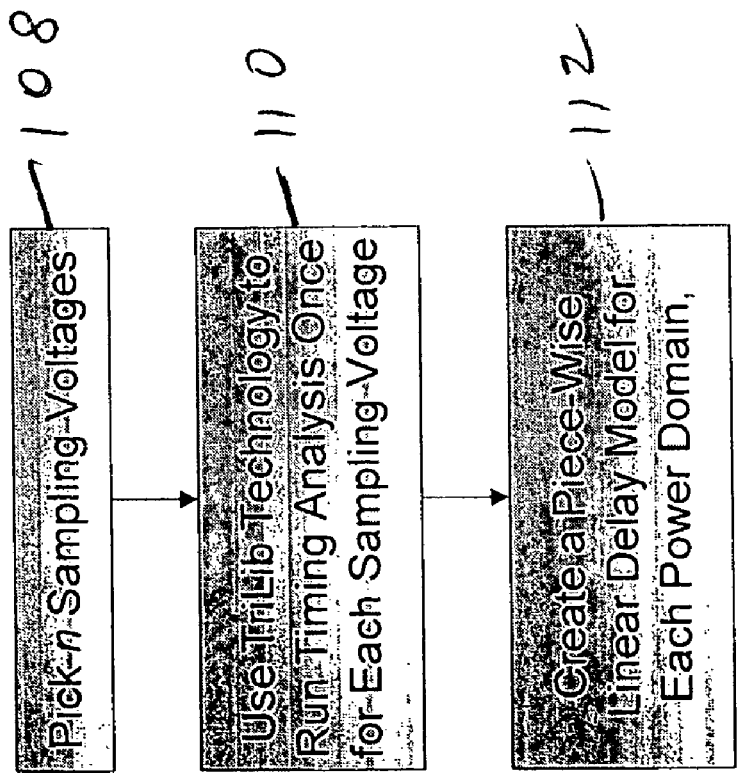
FIG. 13 shows delay modeling for the process of FIG. 12.

The delay modeling 90 in FIG. 12 is shown in more detail in FIG. 13. One begins by picking n sampling voltages as the initial power supply voltages 108. The process is to evaluate the design timing information using the n different voltages, e.g. three voltages as described above. The other voltage values are then found by using interpolation on these results. Then at 110 one uses, e.g., a conventional interpolation technique or equivalent to run a timing analysis once for each sampling voltage. After that one creates a piece-wise linear delay model for each power domain at 112 as described above.

Figure 14:
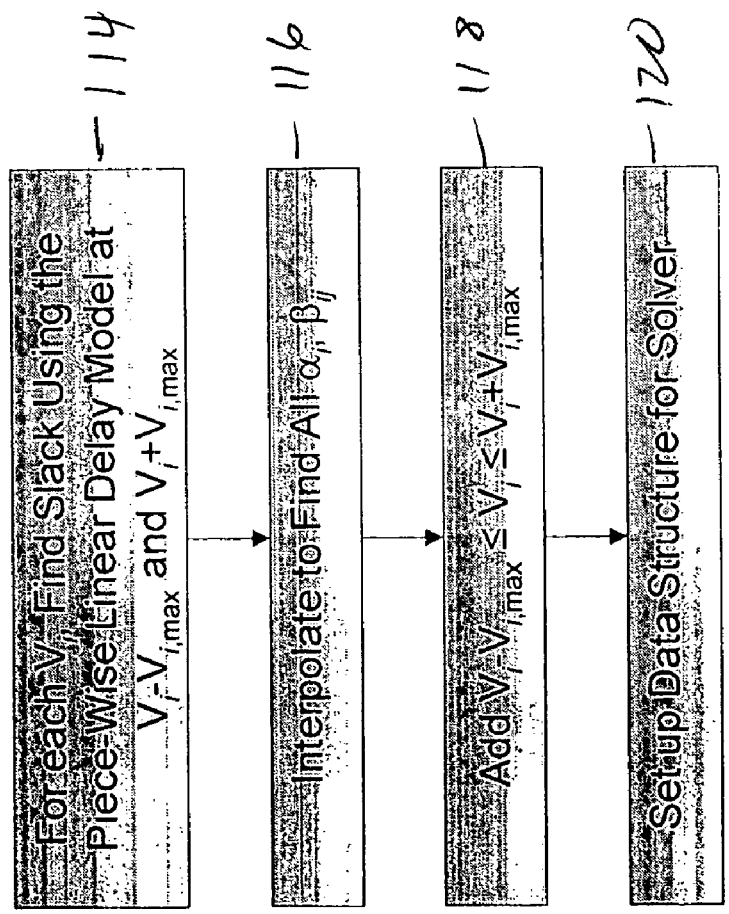
FIG. 14 shows setup for the linear programming for the process of FIG. 12.

FIG. 14 depicts detail of the setup of the linear programming 92 of FIG. 12 which begins with for each voltage $V_i$, finding a slack value using the piece-wise linear delay model at $V_i - V_{i,max}$ and $V_i + V_{i,max}$ at 114. Then one interpolates at 116 to find all values of $\alpha_j$ and $\beta_{ij}$ (as described above) for respectively the internal and external paths. One then adds constraints that the voltage $\Delta V$ for domain i muse be between $V_i - V_{i,max}$ and $V_i + V_{i,max}$ (as described above) at 118. We add these new constraints to the linear programming equations to limit the change of voltage to the bounds, for better accuracy. Then at 120 one sets up the data structure for solution of the linear equations. The "solver" here is part of the readily available linear programming solution software.

Figure 15:
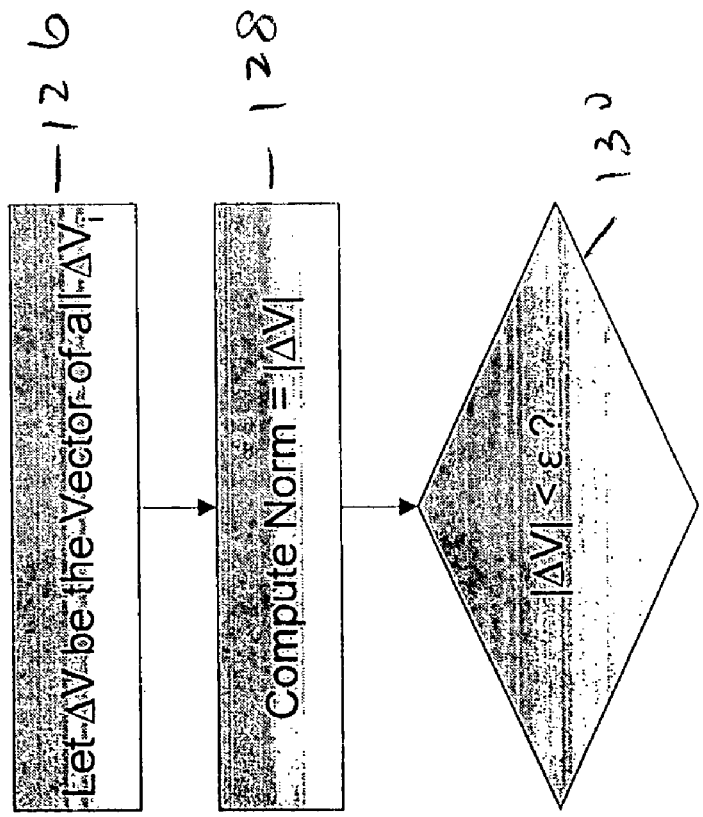
FIG. 15 shows the convergence criteria for the process of FIG. 12.

FIG. 15 depicts the convergence criteria 96 of FIG. 12. This begins at 126 which shows the values of all voltage changes represented as a vector $\Delta V$. Then one computes the norm of vector $\Delta V$ at 128. (Norm of a vector is a well known operator which takes a vector and returns a number. It is denoted by $|\Delta V|$.) We thus compute the norm of vector $\Delta V$. Then at 130, one determines if the norm of $\Delta V$ is less than or equal to the value of a small number $\epsilon$. Here, we check if the norm of the vector is less than some small number $\epsilon$ supplied in the computer code. It is well known that if the norm is less than some small number, the algorithm converges.

Figure 16:
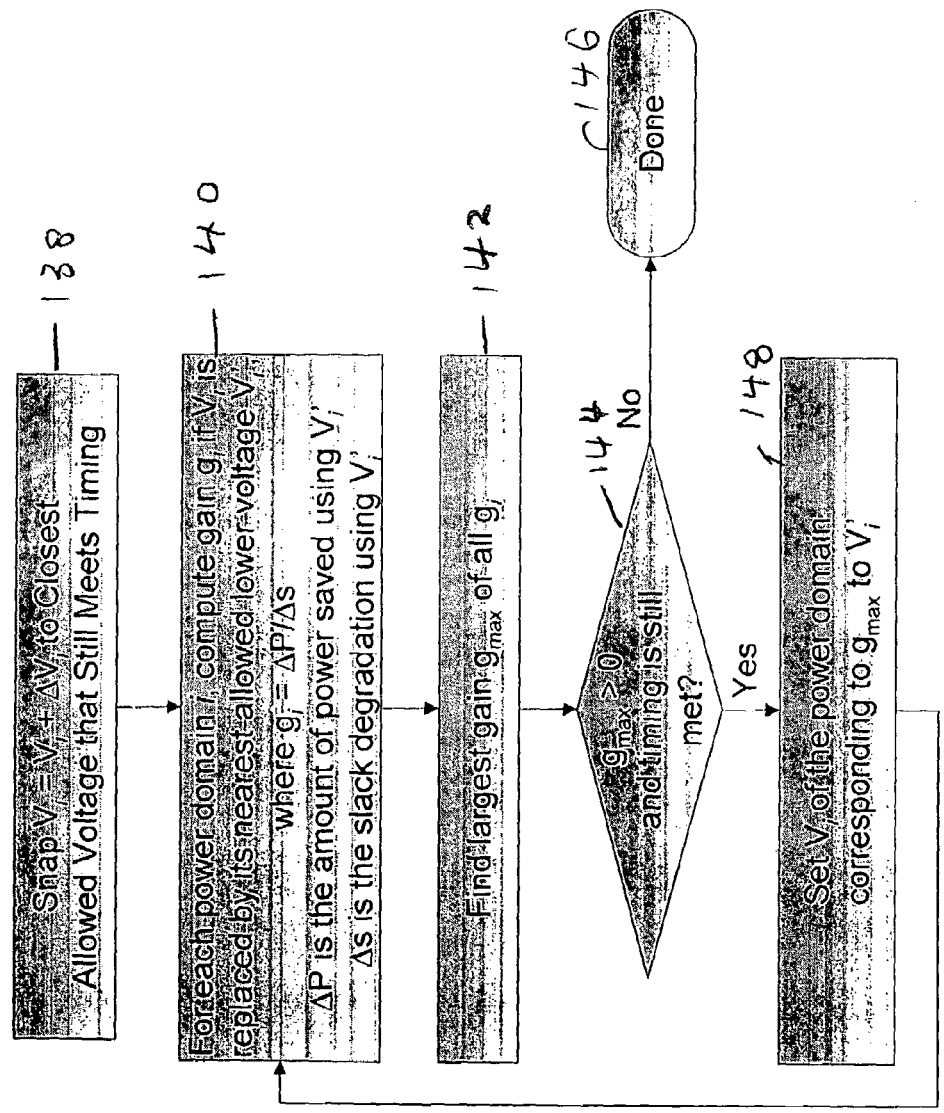
FIG. 16 shows fine-grain optimization for the process of FIG. 12.

The fine-grain optimization 98 of FIG. 12 is depicted in FIG. 16. This begins with snapping the value $V_i = V_i + \Delta V_i$ to the closest allowed voltage that still meets the timing (slack) requirements at 138. It is often the case that there is a discrete set of values that a voltage can take. If the solution falls between 2 numbers, we then change it to the one that has smaller absolute difference (hence "snapping"). Then at 140 for each power domain i one computes the gain $g_i$ if $V_i$ is replaced by its nearest allowed lower voltage $V_i$, where $g_i = \Delta P/\Delta s$, where $\Delta P$ is the amount of power saved using a lower value of voltage $V_i$ and $\Delta s$ is the slack degradation using the lower voltage $V_i$. Next at 142 one finds the largest gain $g_{max}$ of all the values of $g_i$. This is followed at 144 by checking if $g_{max}$ is greater than or equal to zero and making sure that the timing requirement is still met. If not, one terminates at 146 since the power optimization problem has been solved (optimized.) If the timing requirement is still met at 144 then one proceeds to step 148 when one sets $V_i$ of the power domain corresponding to $g_{max}$ to being the value $V_i$ and returns to 140 to run the solution again to try to obtain a better solution.

This solution process in another embodiment is search based, whereby a somewhat different process is used in which one performs the fine-grain optimization step described above until it converges, without formulating and solving the above linear programming problem. This search based version may yield a better or worse result than the linear programming solution, depending on the circuit design.

This disclosure is illustrative and not limiting. Further modifications will be apparent to one skilled in the art in light of this disclosure and are intended to fall within the scope of the invention as defined by the appended claims.

We claim:

1. A method of optimizing power consumption for a design of an integrated circuit including a plurality of power domains, comprising:
   obtaining estimates of timing slack of respective paths internal to respective power domains of the integrated circuit design, based on respective initial power domain power supply voltages;
   obtaining estimates of timing slack of respective paths external to the respective power domains of the integrated circuit design, based on the respective initial power domain power supply voltages, such paths going from respective first power domains to respective second power domains;
   obtaining a model of changes in the timing slack estimates as a first function of incremental changes in the power domain power supply voltages;
   wherein the model of changes includes respective estimates of changes of timing slack of the respective internal paths of the respective power domains as a second function of the incremental changes in such respective power domain power supply voltages; and
   wherein the model further includes respective estimates of changes of timing slack of the respective external paths, as a third function of incremental changes in respective power domain power supply voltages of respective first power domains and respective second power domains at opposite ends of such respective external paths; and
   using the module to arrive at assignments of power domain power supply voltages the provide optimal overall power consumption of the integrated circuit and that meet timing requirements.

2. The method of claim 1, wherein using the model includes summing estimated power consumption of each power domain, and searching for a minimum of the summation while causing the incremental changes in the power domain power supply voltages and while meeting respective internal path timing slack constraints and while meeting respective external path timing slack constraints.

3. The method of claim 1, wherein the function includes a linear function, and includes scaling factors for relating delays internal to the power domains to respective changes in power supply voltage levels of such respective power domains.

4. The method of claim 1, wherein the function includes scaling factors for relating respective delays on the respective external paths between functional blocks to respective changes in power supply voltage levels to respective first power domains and respective second power domains at opposite ends of such respective external paths.

5. The method of claim 1, wherein the function includes respective functions that are related linearly to incremental power supply voltage variation.

6. The method of claim 1, wherein using the model includes performing calculations according to the following formulation to arrive at assignments of power domain power supply voltages that result in optimal overall power consumption:

$$\text{minimum power consumption} = \sum_i f_i \cdot C_i \cdot (V_i + DV_i)^2 \cdot k$$

subject to constraints,
$s_i + \alpha_i \cdot DV_i^3 0$ and $s_{ij} + b_{ij} \cdot DV_i + b_{ji} \cdot DV_j^3 0$, where
$f_i$ is the operating frequency of a functional block i;
k is the switching speed;
$C_i$ is the capacitance of functional block i;
$V_i$ is the voltage level of functional block i;
$DV_i$ is the change in power supply voltage level of functional block i;
$s_i$ is the slack for the internal signal path in functional block i;
$s_{ij}$ is the slack for the signal path from power domain i to a subsequent functional block j;
$\alpha_i$ is slope of delay of the internal signal path with respect to power supply voltage level change in functional block i; and
$\beta_{ij}$ is the slope of delay of the signal path from functional block i to functional block j with respect to power supply voltage level change.

7. The method of claim 1 further comprising using the assigned power supply voltages in a specification of the integrated circuit design.

8. The method of claim 1, wherein the model is used by identifying a power domain for which an incremental voltage change yields a highest ratio of reduction in power consumption for degradation in slack.

9. The method of claim 1, wherein the model is created from estimated slopes relating incremental voltage change as an independent variable to timing slack change as a dependent variable.

10. The method of claim 1, wherein the model is used by searching for a combination of power domain power supply levels that provide for reduced power consumption and acceptable slack values.

11. A computer readable medium comprising computer executable instructions for executing a method comprising:
  obtaining estimates of timing slack of respective paths internal to respective power domains of an integrated circuit design, based on respective initial power domain power supply voltages;
  obtaining estimates of timing slack of respective paths external to respective power domains of the integrated circuit design, based on the respective initial power domain power supply voltages, such paths going from respective first power domains to respective second power domains;
  obtaining a model of changes in the timing slack estimates as a first function of incremental changes in the power domain power supply voltages;
  wherein the model of changes includes respective estimates of changes of timing slack of the respective internal paths of the respective power domains as a second function of the incremental changes in such respective power domain power supply voltages; and
  wherein the model further includes respective estimated changes of timing slack of the respective external paths, as a third function of incremental changes in respective power domain power supply voltages of respective first power domains and respective second power domains at opposite ends of such respective external paths; and
  using the model to arrive at assignments of power domain power supply voltages that provide for optimal power consumption of the integrated circuit and that meet timing requirements.

12. The computer readable medium of claim 11, wherein using the model includes summing estimated power consumption of each power domain, and searching for a minimum of the summation while causing the incremental changes in the power domain power supply voltages and while meeting respective internal path timing slack constraints and while meeting respective external path timing slack constraints.

13. The computer readable medium of claim 11, wherein the function includes scaling factors for relating respective delays on the respective external paths between functional blocks to respective changes in power supply voltage levels to respective first power domains and respective second power domains at opposite ends of such respective external paths.

14. The computer readable medium of claim 11, wherein the function includes scaling factors for relating respective delays on the respective external paths between functional blocks to respective changes in power supply voltage levels to respective first power domains and respective second power domains at opposite ends of such respective external paths.

15. The computer readable medium of claim 11, wherein the function includes respective functions that are related linearly to incremental power supply voltage variation.

16. An integrated circuit produced from a design determined at least in part according to a method comprising:
  obtaining estimates of timing slack of respective paths internal to respective power domains of an integrated circuit design, based on respective initial power domain power supply voltages;
  obtaining estimates of timing slack of respective paths external to respective power domains of the integrated circuit design, based on the respective initial power domain power supply voltages, such paths going from respective first power domains to respective second power domains;
  obtaining a module of changes in the timing slack estimates as a first function of incremental changes in the power domain power supply voltages;
  wherein the model of changes includes respective estimates of changes of timing slack of the respective internal paths of the respective power domains as a second function of the incremental changes in such respective power domain power supply voltages; and
  wherein the model further includes respective estimated changes of timing slack of the respective external paths, as a third function of incremental changes in respective power domain power supply voltages of respective first power domains and respective second power domains at opposite ends of such respective external paths; and
  using the model to arrive at assignments of power domain power supply voltages that provide for optimal overall power consumption of the integrated circuit and that meet timing requirements.

17. The integrated circuit of claim 16, wherein voltages supplied to power domains of the integrated circuit are based on the assignments determined by using the model.

18. The integrated circuit of claim 16, wherein the model is used by identifying a power domain for which an incremental voltage change yields a highest ratio of reduction in power consumption for degradation in slack.

19. The integrated circuit of claim 16, wherein the model is created from estimated slopes relating incremental voltage change as an independent variable to timing slack change as a dependent variable.

20. The integrated circuit of claim 1,
  wherein using the model to arrive at assignments involves using the model to constrain respective power domain voltages to meet timing requirements.

21. The integrated circuit of claim 1,
  wherein using the model to arrive at assignments involves using the model to constrain respective power domain voltages to meet timing requirements while searching for a combination of power domain power supply voltages that result in optimal power consumption for the integrated circuit.

* * * * *